United States Patent [19]

Scholz et al.

[11] Patent Number: 5,294,658
[45] Date of Patent: Mar. 15, 1994

[54] PROCESS FOR THE PREPARATION OF LARGE-PARTICLE, AQUEOUS PLASTIC DISPERSIONS

[75] Inventors: Bernhard-Peter Scholz, Oer-Erkenschwick; Klaus Walther, Marl; Heinz Riemer, Bottrop, all of Fed. Rep. of Germany

[73] Assignee: Huels Aktiengesellschaft, Marl, Fed. Rep. of Germany

[21] Appl. No.: 994,367

[22] Filed: Dec. 21, 1992

[30] Foreign Application Priority Data

Dec. 19, 1991 [DE] Fed. Rep. of Germany .... 4141942.1

[51] Int. Cl.$^5$ ............................................. C08J 3/05
[52] U.S. Cl. ................................. 524/457; 524/755; 524/762
[58] Field of Search ............... 524/457, 757, 755, 762

[56] References Cited

U.S. PATENT DOCUMENTS 4,950,709 8/1990 Schmeter et al. ............... 524/762

FOREIGN PATENT DOCUMENTS

0044030A1 10/1984 European Pat. Off. .
0349383 1/1990 European Pat. Off. .

*Primary Examiner*—Joseph L. Schofer
*Assistant Examiner*—R. H. Delmendo
*Attorney, Agent, or Firm*—Oblon, Spivak, McClelland, Maier & Neustadt

[57] ABSTRACT

The invention provides a process for the preparation of large-particle, aqueous plastic dispersions, which permits targeted adjustment of particle size. The process comprises a system which controls the particle size and comprises the step of polymerizing a monomer in the presence of an anionic emulsifier; a substantially non-branched, nonionic, water-soluble polymer auxiliary; and alkali metal and/or ammonium ions not bonded to emulsifier. The polymer auxiliary can be prepared reproducibly with regard to its agglomerating effect.

11 Claims, No Drawings

PROCESS FOR THE PREPARATION OF LARGE-PARTICLE, AQUEOUS PLASTIC DISPERSIONS

BACKGROUND OF THE INVENTION

1. Field of the Invention

The invention relates to a process for preparing large-particle, aqueous dispersions, which permits targeted adjustment of particle size. In the present specification, large-particle dispersions denote dispersions in which the particles have a volume-average diameter (dv) in the range of 130 to 1,000 nm, preferably 150 to 800 nm. Dispersions of this type are still flowable after concentration to a solids content of >55% by mass. They are, therefore, considered to be of low viscosity.

2. Discussion of the Background

A number of processes for preparing large-particle, aqueous dispersions have been developed in the prior art, but these all differ from the present process and suffer from a number of shortcomings and disadvantages.

In British Patent 991,394 (Polymer Corp. I), there is described a process for the preparation of large-particle, aqueous plastic dispersions, in which a nonionic, water-soluble polymer auxiliary (agglomerating agent) is added to an aqueous plastic dispersion after polymerization. By distilling off some of the water, plastic dispersions of low viscosity and high solids content are obtained. Preferably the polymer auxiliaries are substantially non-branched and have a molecular structure containing hydrophobic and hydrophilic radicals. Less preferred polymer auxiliaries have an AB block structure with a hydrophobic radical A and a non-branched hydrophilic radical B. These auxiliaries are the monolaurate, monostearate and monooleate derivatives of a polyethylene glycol (polyethylene oxide) having a molecular weight of 6,000. This process can be modified such that the polymer auxiliary is added to the reaction mixture from which the plastic dispersion is obtained. As such, the polymer auxiliary can specifically be added either before or after initiation of the polymerization. However, these auxiliaries are used in an amount of 0.1 parts by weight, based on the weight of total monomers plus sodium sulfate.

In German Offenlegungsschrift (German Published Specification) 2,222,176 (Polymer Corp. II), there is described a process for the preparation of large-particle, aqueous plastic dispersions in which a nonionic, water-soluble polymer auxiliary is added to the reaction mixture, from which the plastic dispersion is obtained, before initiation of polymerization. The polymer auxiliary is substantially non-branched and has a molecular structure containing both hydrophobic and hydrophilic radicals. However, the polymer auxiliaries do not have an AB block structure with a hydrophobic radical A and a hydrophilic radical B. Additionally, the large-particle dispersions of this process are prone to coagulation.

In European Offenlegungsschrift (European Published Specification) 330,865, a process for the preparation of large-particle, aqueous plastic dispersions is described. It permits targeted adjustment of the particle size of the dispersions independently of other target parameters, such as the molecular weight of the polymers, i.e. it permits the adjustment of the volume-average diameter (dv), and the particle size distribution. In particular, targeted adjustment of a narrow, monomodal distribution is possible. This process employs a preferred polymer auxiliary which is an oxidized polyethylene oxide, i.e. a mixture of a non-branched and a branched polyethylene oxide. However, neither of the two constituents of the mixture contain any hydrophobic radicals. Another preferred polymer auxiliary of this process is the reaction product obtained from the trimerization product of isophorone diisocyanate and polyethylene oxide monoethyl ether. This is a mixture in which the main component has a molecular structure containing a branched hydrophobic radical and three hydrophilic radicals. The main component is thus branched and does not have a AB block structure with a hydrophobic radical A and a hydrophilic radical B.

The polymer auxiliaries of European Offenlegungsschrift (European Published Specification) 330,865, which represent the closest prior art, are non-uniform and in the form of a mixture, the composition of which varies, depending on the conditions for the preparation of the polymer auxiliary. Under certain circumstances, the structure of the components of the mixture also varies, depending on the preparation conditions. Accordingly, the agglomerating effect of the polymer auxiliaries varies. They, therefore, do not always meet the stringent requirements demanded in practice regarding the reproducibility of their agglomerating effect. Moreover, they are characterized only inadequately by conventional analytical methods.

SUMMARY OF THE INVENTION

One object of the present invention is to provide a process for the preparation of large-particle, aqueous plastic dispersions, which process is distinguished from and overcome the disadvantages of the described prior art.

Another object of the present invention is a process for the preparation of large-particle, aqueous plastic dispersions, which process permits targeted adjustment of particle size.

The subject of the invention is, thus, a process for the preparation of large-particle, aqueous plastic dispersions by emulsion polymerization of monomers which are polymerizable by free radicals, in the aqueous phase as the dispersion medium, in which the polymerization occurs in the presence of an anionic emulsifier or of a mixture of an anionic emulsifier and a nonionic emulsifier; a nonionic, water-soluble polymer auxiliary; a polymerization initiator which produces free radicals; and conventional polymerization auxiliaries.

Prior to polymerization, 0.0001 to 0.05 parts by weight, preferably 0.0005 to 0.02 parts by weight, of a substantially non-branched polyethylene oxide having an AB block structure is added as polymer auxiliary, based on 100 parts by weight of the monomer or monomers. In this block copolymer, A denotes a branched or non-branched hydrophobic radical comprising 15 to 70 carbon atoms, preferably 18 to 50 carbon atoms, and B denotes a non-branched hydrophilic radical comprising at least 50 ethylene oxide units, preferably at least 60 ethylene oxide units, and most preferentially 80 to 300 ethylene oxide units.

The hydrophobic radical A is an alkyl radical, preferably a medium or long chain alkyl radical, the oleyl radical, or an (alkyl)aryl radical, such as, for example, a nonylphenyl radical or a dinonylphenyl radical, or a distyrylphenyl radical.

The polymer auxiliaries are obtained in a known manner by reaction of phenols, alcohols or amines with the desired amount of ethylene oxide as described in Volume 2, pages 72-96 of *Kirk-Othmer Encyclopedia of Chemical Technology*, which is incorporated herein by reference. They can be characterized by gel phase chromatography (GPC).

In an embodiment of the present invention, water-soluble alkali metal salts or ammonium salts are employed at the start of the polymerization. In this embodiment 1 to 250 mmol, preferably 10 to 100 mmol, of alkali metal ions or ammonium ions not bonded to emulsifier are present in the aqueous phase per liter of the aqueous phase.

The polymerization is carried out by either batch procedure or by starting in a batch procedure and, after particle-formation phase, continuing under conditions for graft polymerization, i.e. preventing the formation of new particles. The particle-formation phase is completed as a rule, in less than 15 min, usually in less than 10 min, after the start of polymerization.

In the case of the batch-graft procedure, greater than 10% by weight of the total monomers are initially introduced for the batch procedure. The change to graft polymerization does not take place immediately after the particle-formation phase, which under certain circumstances does not take even 1 min, but only after conversion of greater than 50% by weight of the introduced monomers.

If only part of the emulsifier is initially introduced into the reactor, then the procedure is a semi-continuous emulsion feed procedure and the monomer, initiator, and the remainder of the emulsifier are added during the course of polymerization.

If all of the emulsifier is initially introduced into the reactor, then the procedure is a semi-continuous monomer feed procedure and monomer and, where appropriate, initiator are added during the course of polymerization.

These definitions (compare H. Fikentscher et al., Angew. Chemie 72 (1960), pages 860-861) apply such that the mixture resulting after the particle-formation phase in the batch procedure is present in the vessel at the start of the feed procedure.

An essential element of the present process is an effective system which controls the particle size. This system comprises the anionic emulsifier, the polymer auxiliary (the essentially non-branched polyethylene oxide), and the alkali metal and/or ammonium ions which are not bonded to emulsifier. The components of the particle size-controlling system of the invention are in a functional relationship.

Homopolymers and copolymers of industrially valuable monomers polymerizable by free radicals can be prepared by the process of the present invention. The monomers can be monoolefinically unsaturated, such as, for example, vinyl chloride, vinylidene chloride, vinyl esters, monoalkenylaromatic compounds, vinylpyridine, acrylonitrile, methacrylonitrile, acrylic acid esters, methacrylic acid esters and $\alpha, \beta$-olefinically unsaturated carboxylic acids. The monomers can also belong to the group of aliphatic, conjugated dienes, such as, for example, 1,3-butadiene and isoprene. The proportion of unsaturated carboxylic acids in the monomer mixture is no higher than 30% by weight. The polymers can be modified by incorporating a small proportion of another monomer, such as, for example, acrylamide or methacrylamide.

In a preferred embodiment of the present process, the monomer mixture comprises 25 to 68.5% by weight of a hardening monomer selected from the group consisting of styrene, acrylonitrile, methacrylonitrile and methyl methacrylate; 30 to 70% by weight of a plasticizing monomer selected from the group consisting of 1,3-butadiene, $C_4$- to $C_8$-alkyl acrylate, and $C_4$- to $C_8$-alkyl methacrylate; and 1.5 to 5% by weight of an $\alpha, \beta$-olefinically unsaturated carboxylic acid selected from the group consisting of acrylic acid, methacrylic acid, itaconic acid, fumaric acid and the half-esters of the latter two acids. The resulting copolymer dispersions have a minimum film-forming temperature of less than 100° C. They are stable to electrolytes and are advantageously suitable for the production of coating materials for carpets (precoat) and for paper coating compositions.

Special plastic dispersions comprising styrene and acrylates and prepared by the present process are useful as binders in hydraulically setting compositions, for example, tile adhesives and joint sealing compositions, and as binders in latex paints. Plastic dispersions comprising greater than 80% by weight of hardening monomer, based on the weight of the total monomers, are useful as organic pigments (plastic pigments) in paper coating compositions in the production of high gloss paper.

The anionic emulsifiers used in the present invention are conventional anionic emulsifiers, in particular, sulfonic acids, such as alkylsulfonic acids, alkylarylsulfonic acids, $C_{13}$- to $C_{18}$-sulfosuccinic acid esters and their alkali metal and ammonium salts;

$C_{10}$- to $C_{20}$-sulfuric acid half-esters and their alkali metal and ammonium salts; and fatty soaps and resin soaps.

If the polymerization is to be carried out in an alkaline pH range, any of these three groups of emulsifiers can be used. If the polymerization is to be carried out in an acid pH range, particularly in the preparation of carboxylated dispersions, either of the first two groups can be used.

The polymerization initiator is a conventional polymerization initiator which produces free radicals. It can be an organic peroxide or hydroperoxide, such as, for example, cumene hydroperoxide, in combination with a reducing agent which is dispersible in water, such as, for example, iron (II) sulfoxylate complex (an initiator of the redox type) or an inorganic peroxide, such as, for example, potassium persulfate, sodium perborate or hydrogen peroxide. Using an initiator of the redox type, the polymerization can be carried out at a temperature of between 0 and 50° C. Using the inorganic peroxide, the polymerization is generally carried out between 50 and 85° C.

As the amount of initiator increases, the molecular weight of the polymer falls.

The particle size distribution of the dispersions can be controlled by means of the amount of anionic emulsifier, optionally, in combination with the amount of persulfate.

In the case of the preparation of carboxylated dispersions, a narrow, monomodal distribution is obtained with an amount of anionic emulsifier of less than 2 parts by weight, irrespective of the amount of persulfate, and a less narrow, bimodal distribution is obtained using an amount of anionic emulsifier of greater than or equal to 2 parts by weight, in combination with an amount of persulfate of greater than or equal to 0.8 part by weight. The rule applies with higher limits for the preparation of non-carboxylated dispersions. The limits can be determined by simple experiment.

In the batch variant of the present process, there is a preferred procedure in which an amount greater than or equal to 0.05% by weight of anionic emulsifier, based on total monomers, is initially introduced. After a monomer conversion of 3 to 30% by weight, based on total monomers, the remaining emulsifier is metered in. In this procedure, a high total amount of emulsifier leads to small particles and a low total amount of emulsifier to large particles. Additionally, a high metering rate of the emulsifier leads to small particles, while a low metering rate of the emulsifier to large particles.

The alkali metal and ammonium salts which can be used are, for example, the chlorides, sulfates, persulfates, perborates, carbonates and phosphates and also the salts of conventional polymerization auxiliaries, such as, for example, the ethylenediaminetetraacetates used as complex-forming agents and the salts of the condensation products of naphthalenesulfonic acid and formaldehyde, of poly-2-acrylamido-2-methylpropanesulfonic acid (German Auslegeschrift (German Published Specification) 2,540,468) and of polysulfonic acids of medium chain alkanes (European Patent 36,904), which are used as dispersing agents.

In addition to the polymerization auxiliaries further conventional polymerization auxiliaries can be added, for example, regulators, such as, dodecylmercaptan.

The polymerization is usually carried out to a conversion of 100% by weight. However, it can also be interrupted at a lower conversion. The residual monomers are then recovered in a separate process step.

A pressure-proof stirred vessel, which is fitted with a cooling jacket or other known cooling devices to remove the heat of polymerization, can be used for preparation of the dispersions.

In the case of polymerization by the batch procedure, the polymerization vessel is filled, after applying a vacuum and flushing with nitrogen, with water, anionic emulsifier, monomers and the auxiliaries in a conventional manner. The monomer/water ratio is preferably adjusted such that a solids content of 30 to 55% by weight results after the polymerization. The polymerization is then started by adding the polymerization initiator and by raising the temperature. The polymerization time is generally 6 to 15 hours, preferably 8 to 12 hours. If the polymerization is carried out in the acidic pH range when preparing carboxylated dispersions, the pH is usually adjusted with ammonia to a value of 8.0 to 9.0, when the polymerization is complete. The resulting dispersions can be used directly in certain fields of application, without modifying the solids content and the viscosity. Some fields of application require evaporation of the dispersions obtained above to the desired solids content. The dispersion can be evaporated up to a viscosity of 1,200 mPas, measured at room temperature using a Brookfield viscometer (spindle 3, 30 rpm), a solids content of 55 to 70% by weight resulting depending on the existing particle size and particle size distribution. The evaporation takes place at 20° to 60° C., with stirring, under vacuum. In the case of carboxylated synthetic rubber dispersions, concentrated dispersions of this type are advantageously suitable for the production of coating materials for carpets (precoat) and paper. Non-carboxylated synthetic rubber dispersions are suitable for coating backing foam on carpets and for the production of foam mouldings. Polystyrene dispersions are suitable as reinforcing agents for rubber dispersions.

Other features of the invention will become apparent in the course of the following descriptions of exemplary embodiments which are given for illustration of the invention and are not intended to be limiting thereof. In these examples (%) denotes percent by weight and (P.) denotes parts by weight.

Preparation of the aqueous plastic dispersions 1 to 9

In Examples 1 to 7, the polymer auxiliary used was an ethoxylated dinonylphenol (150 mol of ethylene oxide/mol of phenol; GPC-determined, weight-average molecular weight $\overline{M}w = 7134$).

Example 1 (Dispersion 1)

150 P. of completely desalinated water, 0.75 P. of a commercially available sodium ($C_{16}$- to $C_{18}$-paraffin) sulfonate, 0.001 P. of the ethoxylated dinonylphenol, 0.05 P. of the tetrasodium salt of ethylenediaminetetraacetic acid, 0.75 P. of tert-dodecylmercaptan, 2.5 P. of acrylic acid, 47.5 P. of styrene and 50 P. of 1,3-butadiene were added together in a 40 liter pressure reactor. A pH value of 2.4 was established. The batch was heated to 40° C. An aqueous solution of 0.2 P. of ammonium persulfate was then added. The temperature was raised to 80° C. in the course of 5 hours and the polymerization continued for a further 4 hours (total polymerization time: 5+4=9 h). The pH value was then adjusted to 6.9 using ammonia. The resulting dispersion had a solids content of about 40%. It was concentrated until a viscosity of 1,200 mPas was established. The solids content was then 53.6%. The dispersion was characterized as indicated in Table 1 below.

Examples 2 and 3 (Dispersions 2 and 3)

In Examples 2 and 3 the amount of initiator and the amount of alkali metal and ammonium ions not bonded to emulsifier was varied. The resulting dispersions were characterized as indicated in Table 1.

Example 4 (Dispersion 4)

The procedure was as in Example 1, except that 0.46 P. of potassium sulfate, based on 100 P. of monomer, were added before polymerization. The resulting dispersion was characterized as indicated in Table 1. The amount of alkali metal and ammonium ions not bonded to emulsifier was identical to that in Example 3 and good agreement was found with respect to dv and solids content at 1,200 mPas.

Examples 1 to 4 illustrate the effect of the alkali metal and ammonium ions not bonded to emulsifier on dv and the solids content at 1,200 mPas.

Example 5 (Dispersion 5)

100 P. of completely desalinated water, 0.1 P. of a commercially available sodium ($C_{16}$- to $C_{18}$-paraffin) sulfonate, 0.005 P. of ethoxylated dinonylphenol, 0.05 P. of the tetrasodium salt of ethylenediaminetetraacetic acid, 0.75 P. of tert-dodecylmercaptan, 2.5 P. of acrylic acid, 47.5 P. of styrene and 50 P. of n-butyl acrylate were added together in a 4 liter glass double-walled reactor. A pH value of 2.2 was established. The batch was heated to 40° C. An aqueous solution of 0.5 P. of ammonium persulfate was then added. The temperature was raised to 85° C. in the course of 4 h and the polymerization continued and completed in the course of a further 4 hours. The pH value was then adjusted to 8.5 using ammonia. The dispersion was characterized as indicated in Table 2 below.

Example 6 (Dispersion 6)

The procedure was as in Example 5, except that 150 P. of completely desalinated water, 0.25 P. of sodium lauryl sulfate instead of the paraffin sulfonate, 0.02 P. of ethoxylated dinonylphenol, 97.5 P. of styrene were employed and no butyl acrylate was used. A pH value of 2.1 was established. After the polymerization was complete, the pH value was adjusted to 8.5 using ammonia. The dispersion was characterized as indicated in Table 2.

Example 7 (Dispersion 7)

The procedure was as in Example 6, except that 0.2 P. of a commercially available sodium ($C_{16}$- to $C_{18}$-paraffin) sulfonate instead of the lauryl sulfate, 0.01 P. of ethoxylated dinonylphenol and 0.7 P. of tert-dodecylmercaptan were used. The dispersion was characterized as indicated in Table 2.

Example 8 (Dispersion 8)

The procedure was as in Example 7, except that instead of ethoxylated dinonylphenol used in that example, the same amount of an ethoxylated dinonylphenol having an ethylene oxide/phenol molar ratio of 80/1 (weight-average molecular weight $\overline{M}w = 3925$) was used.

Example 9 (Dispersion 9)

The procedure was as in Example 8, except that instead of ethoxylated dinonylphenol used in that example, the same amount of an ethoxylated distyryl phenol (100 mol of ethylene oxide/mole of phenol; weight-average molecular weight $\overline{M}w = 4990$) was used.

Dispersions 1 to 9 are low in coagulation and have a narrow, monomodal particle size distribution.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A process for the preparation of a large-particle, aqueous plastic dispersion by emulsion polymerization of monomers which are polymerizable by free radicals, in an aqueous phase as dispersion medium, comprising the step of polymerizing said monomers in the presence of an anionic emulsifier;
an nonionic, water-soluble polymer auxiliary;
a polymerization initiator forming free radicals;
water-soluble salt; and
conventional polymerization auxiliaries, wherein the polymer auxiliary is added before polymerization, wherein the water-soluble salt is at least one member selected from the group consisting of alkali metal salt and ammonium salt and is present at the start of the polymerization in an amount of 1 to 250 mmol of alkali metal ions or ammonium ions which are not bonded to emulsifier in the aqueous phase per liter of aqueous phase, wherein the polymer auxiliary is a polyethylene oxide block-containing polymer having an AB block structure, in which A is either a branched or non-branched hydrophobic alkyl or (alkyl)aryl radical comprising 15 to 70 C atoms or oleyl or distyrylphenyl radical, and B is a non-branched hydrophilic radical comprising at least 50 ethylene oxide units, and wherein the amount of the polymer auxiliary, based on 100 parts by weight of the monomer, is 0.0001 to 0.05 parts by weight, wherein the polymerization is carried out by batch procedure or is started in a batch procedure and, after particle formation phase, is continued and completed under conditions for graft polymerization preventing the formation of new particles.

2. The process of claim 1, wherein the hydrophobic radical A comprises a radical containing 18 to 50 C atoms.

3. The process according claim 2, wherein the hydrophilic radical B comprises at least 60 ethylene oxide units.

4. The process of claim 3, wherein the hydrophilic radical B comprises 80 to 300 ethylene oxide units.

5. The process according to claim 1, wherein the hydrophobic radical A is an alkyl radical or an (alkyl)aryl radical.

TABLE 1

Preparation and characterization of Dispersions 1 to 4

| Dispersion | Initiator P./100 P. of monomer | $[Na^+] + [K^+] + [NH_4^+]$ not bonded to emulsifier (mmol/l) | PM time (h)** | ST (mN/m) | dv (nm) | I | Solids content at 1,200 mPas |
|---|---|---|---|---|---|---|---|
| 1 | 0.2 | 12 | 9 | 57.8 | 136 | 0.0074 | 53.6 |
| 2 | 0.5 | 29 | 12 | 52.0 | 187 | 0.0108 | 57.9 |
| 3 | 0.8 | 47 | 15 | 47.1 | 203 | 0.0099 | 59.8 |
| 4 | 0.2 | 47* | 18 | 48.2 | 198 | 0.0100 | 59.6 |

PM time = polymerization time.
ST = surface tension.
I = inhomogeneity = $\frac{dv}{dn} - 1$.
dn = number-average particle diameter.
dv and dn were determined by the electron microscopic measuring procedure of DIN 66 141.
*0.46 P. of potassium sulfate, based on 100 P. of monomer, were added before polymerization.
**The heating time for raising the temperature in the presence of the initiator to the desired polymerization temperature was 5 h in each case.

TABLE 2

Preparation and characterization of Dispersions 5 and 9

| Dispersion | PM time (h) | ST (mN/m) | dv (nm) | I |
|---|---|---|---|---|
| 5 | 8 | 44 | 566 | 0.005 |
| 6 | 6 | 45 | 377 | 0.015 |
| 7 | 6 | 43 | 636 | 0.045 |
| 8 | 6 | 43 | 445 | 0.008 |
| 9 | 6 | 44 | 560 | 0.010 |

6. The process according to claim 1, wherein the polymerization is started in a batch procedure and, after particle-formation phase is completed, continues in a semi-continuous emulsion feed procedure or in a semi-continuous monomer feed procedure.

7. The process according to claim 1, wherein 0.02 to 4.0 parts by weight of the anionic emulsifier, based on 100 parts by weight of monomer, are added.

8. The process of claim 7, wherein 0.05 to 3.0 parts by weight of the anionic emulsifier, based on 100 parts by weight of monomer, are added.

9. The process according to claim 1, wherein the polymerization initiator added is 0.1 to 2.5 parts by weight of a persulfate, based on 100 parts by weight of monomer.

10. The process of claim 9, wherein the polymerization initiator added is 0.1 to 1.5 parts by weight of a persulfate based on 100 parts by weight of monomer.

11. The process according to claim 1, wherein the monomer/water ratio is adjusted such that the dispersion has a solids content of 30 to 55% by weight after polymerization.

* * * * *